United States Patent Office 3,323,021
Patented May 30, 1967

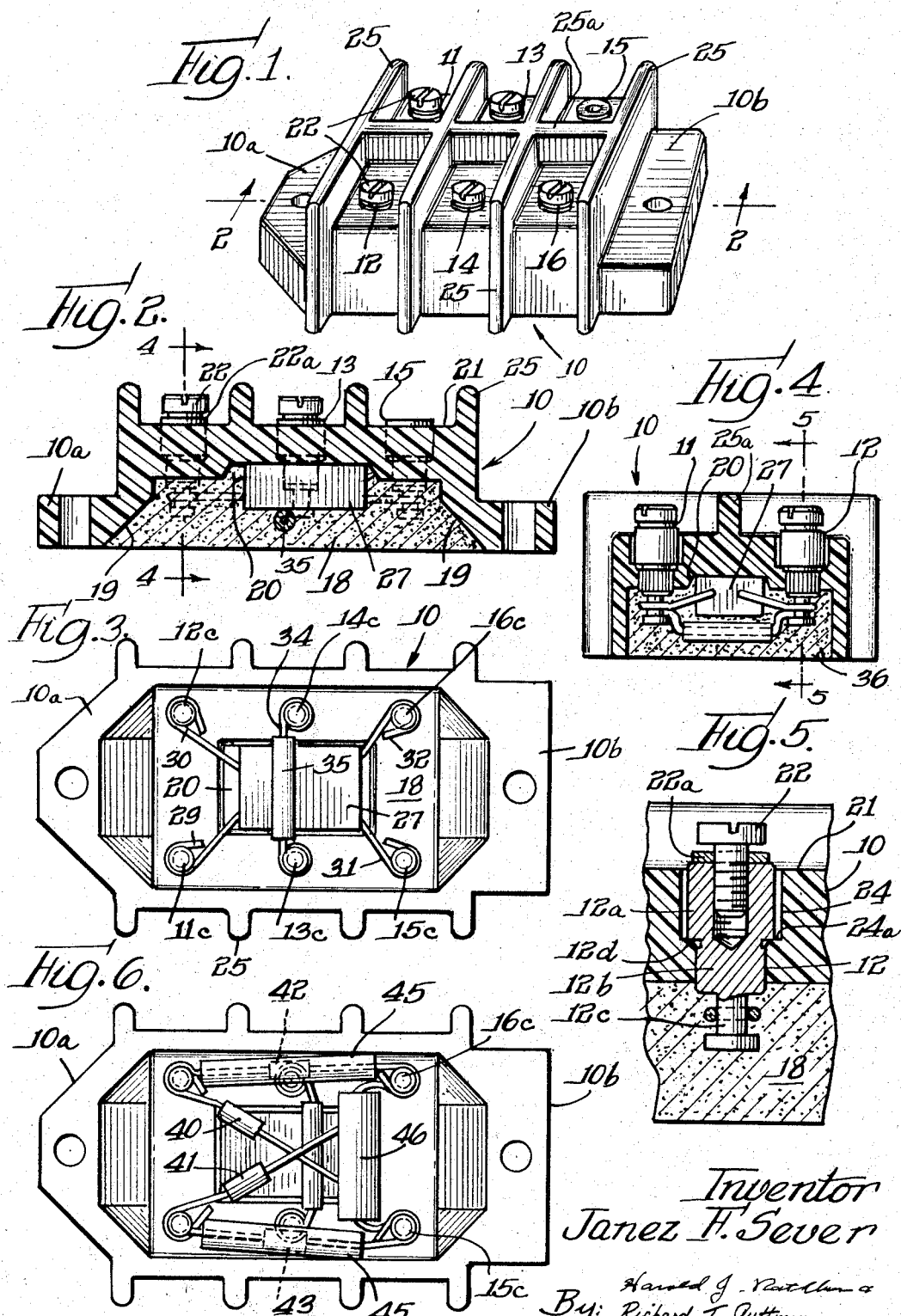

3,323,021
COMBINATION TERMINAL BLOCK AND ELECTRICAL COMPONENT ASSEMBLY
Janez Frank Sever, Cleveland, Ohio, assignor to Square D Company, Park Ridge, Ill., a corporation of Michigan
Filed Mar. 8, 1965, Ser. No. 438,013
1 Claim. (Cl. 317—101)

This invention relates to an improvement in combination terminal block and electrical component assemblies and, more particularly, to a terminal block and electrical component assembly wherein a terminal block is provided, on its underside, with a recess in which small electrical components, such as silicon diodes, may be conveniently electrically connected to terminals of the terminal block and retained by encapsulation.

A preferred embodiment of the present invention, when provided with rectifier diodes, is particularly suited for use where direct current of relatively small magnitude may be required for control purposes in controllers for alternating current motors. An assembly in accordance with this invention thus may provide a compact terminal block having a full-wave rectifier bridge incorporated therein and electrically connected thereto so that, when two terminals on the terminal block are connected to an A.C. source, two other terminals on the terminal block provide a source of unidirectional current.

Diodes and other semi-conductors or other small electrical components are commonly used on supporting panels with other much larger and rugged electrical equipment. When so used, the small components are susceptible to damage by being struck by other objects when, for instance, the larger equipment is assembled on the panel or repairs are being made to the larger equipment. For this reason, it is desirable to provide a protective enclosure for the small components which, under normal use, prevents their being damaged by physical impact. Also, in manufacturing such panels, it is often desirable that the constituent parts thereof be in convenient modular units to facilitate assembly and wiring.

Small electrical components, such as semi-conductors, require careful handling because of their small size, and their assembly on panels with larger equipment is not readily accomplished by those ordinarily accustomed to working with larger components. In accordance with the present invention, the small electrical components can be pre-assembled into a terminal block by others normally accustomed to working with small delicate parts, and the completed assembly becomes a rugged unit which can be stocked as a module for later mounting on a panel by the former group of workers.

It is an object of this invention to provide an improved terminal block and electrical component assembly which is compact, rugged, and relatively easy to assemble.

Another object is to provide a terminal block and electrical component assembly wherein semi-conductors, or other small and delicate components, are retained in a recess in a terminal block and thereby protected from damage caused by impact with other objects.

A further object is to provide a terminal block and electrical component assembly which, when two terminals of the terminal block are connected to an alternating current source, provides a rectified unidirectional current source at two other terminals of the terminal block.

A still further object is to provide an improved terminal block and electrical component assembly which can be completely pre-assembled and then stored for later use as a modular unit in connection with other electrical devices.

A more detailed object is to provide a combined terminal block and semi-conductor assembly comprising an insulating terminal block having a recess on the underside thereof, at least two pairs of electrically conductive terminal members carried by the block and extending from an upper surface of the block through respective apertures in the block to the underside thereof and extending into the recess, each of said terminal members being provided with fastening means at the upper surface of the block and with a binding post on the underside of said block in said recess, semi-conductor means electrically connected to selected ones of said binding posts in said recess, and encapsulating material in said recess surrounding said binding posts and said semi-conductor means.

Various other objects and advantages will become apparent from the following description, wherein reference is made to the drawings of a preferred embodiment of the invention and in which:

FIG. 1 is a perspective view of a combined terminal block and electrical component assembly embodying the present invention;

FIG. 2 is a cross-sectional view taken generally along the line 2—2 of FIG. 1;

FIG. 3 is a bottom plan view of the assembly of FIG. 1, the encapsulating material being removed to show internal structure;

FIG. 4 is a cross-sectional view taken generally along the line 4—4 of FIG. 2;

FIG. 5 is an enlarged fragmentary sectional view taken generally along the line 5—5 of FIG. 4 and showing, in detail, the structure of a terminal member of the terminal block of FIG. 1; and FIG. 6 is a bottom plan view of an alternative embodiment of the invention, the encapsulating material being removed as in FIG. 3.

Referring to FIGS. 1 through 5, a combined terminal block and electrical component assembly in accordance with this invention comprises a terminal block 10 molded of suitable rigid insulating material and having apertured mounting supports 10a and 10b extending outwardly from opposite ends, respectively. Three pairs of identical conductive terminal members 11 and 12, 13 and 14, and 15 and 16, are carried by the block 10. The underside of the terminal block 10 is provided with a generally rectangular recess 18 which has sloping end wall portions 19 to facilitate molding of the block 10 and to provide convenient access to the recess 18. Centrally disposed in an inner or upper wall of the recess 18 is a relatively shallow, generally rectangular recess 20.

Each of the terminal members 11 through 16 extends from an upper surface 21 of the block 10 through the body of the block to the underside thereof and protrudes into the recess 18. Each terminal member is provided, at the upper surface of the terminal block, with fastening means such as a terminal screw 22 and a lock washer 22a, the screws 22 being received in suitably threaded portions of the respective terminal members.

The terminal members 11–16 and the manner in which they are assembled into the block 10 will now be described in further detail with reference to FIG. 5. Although FIG. 5 shows only the terminal member 12, it is to be understood that all of the terminal members 11–16 are identical. Specific portions of the other terminal members are identified by the reference numeral for the specific terminal member together with the same suffix as is used hereinafter in connection with the portions of the terminal member 12.

Referring to FIG. 5, the terminal member 12 has a generally cylindrical upper body portion 12a and a reduced lower shank portion 12b which terminates in a binding post 12c. The body portion 12a is loosely received in an enlarged upper portion of a cylindrical opening 24 in the body of the terminal block 10, like openings 24 being provided for the other terminal members. In order that the terminal member 12 may be securely held in the terminal block 10, the shank portion 12b and a reduced lower portion of the opening 24 are proportioned to have an interference fit. The shank portion 12b is preferably knurled or otherwise ribbed or scored so that, when the terminal post 12 is driven into the opening 24, the interference fit between the shank portion 12b and the wall of the reduced inner portion of the opening 24 secures the terminal member 12 to the terminal block 10 against both axial forces and turning moments. An annular shoulder 12d between the portions 12a and 12b abuts against a complementary annular shoulder 24a of the opening 24 when the terminal post is fully inserted into the circular opening 24.

Because it is desirable to provide adequate electrical clearance between adjacent terminal members, the terminal block 10 is provided with a plurality of transverse barriers 25 intersected by longitudinal barriers 25a. The barriers 25 and 25a are preferably molded integrally with the block 10 and, as illustrated, comprise vertical body portions or ribs disposed normally of the upper surface 21, the barriers 25 continuing and extending also along opposite sides of the terminal block 10.

The recess 20 is adapted to contain small electrical components such as semi-conductors which may be electrically connected to selected ones of the binding posts 11c, 12c, 13c, 14c, 15c, and 16c of the terminal members 11 through 16. In the illustrated embodiment, there is provided a unitary semiconductor means such as an encapsulated diode rectifier bridge module 27. The rectifier bridge module 27 is a commercially available device which comprises four rectifier diodes arranged in a bridge circuit and encapsulated to form a rectangular parallelepiped thereby to permit convenient use of the module as a component in a further electrical assembly. In any full-wave rectifier bridge, two input terminals are provided for connection to an alternating current source; and two additional terminals constitute an output for the rectifier bridge and provide a source of direct current when the input terminals are connected to an alternating current. Commercially available encapsulated rectifier bridges such as the module 27 generally have indicated thereon the polarities of the output leads and designate which pair of leads is to be connected to the alternating current source.

Thus, the rectifier bridge module 27 has four leads 29, 30, 31, and 32 which are mechanically and electrically connected to respective binding posts 11c, 12c, 15c, and 16c, as best illustrated in FIG. 3. The leads 29 and 30 may be the direct current output leads and the leads 31 and 32 may be the input leads which are to be connected to an alternating current source. The binding posts 13c and 14c are electrically interconnected by a jumper wire 34. The wire 34, which in this instance is covered by a length of insulating tubing 35 to maintain electrical clearance, serves to illustrate the manner in which other electrical components may be secured to binding posts in the recess 18.

After these various components have been placed in the recesses 18 and 20, and after electrical connections between the components and the binding posts have been made, the recesses 18 and 20 are filled with encapsulating or potting material, indicated in FIGS. 4 and 5 by the numeral 36, which embeds the various elements within the recesses and hermetically seals the same. The encapsulating or potting material is preferably an insulating material which has good heat conductivity properties notwithstanding its electrical insulating property. The encapsulating material 36 bonds itself to the rectifier bridge module 27 and also to the binding posts, the walls of the recesses 18 and 20, and to any other components within the recesses.

It is desirable, before the recesses are filled with encapsulating material, to seal the area around each of the binding posts 11c through 16c with a suitable compound (not shown) so that when the device is encapsulated none of the encapsulating material will flow around the terminal members through the respective openings to the upper surface of the block 10.

The alternative embodiment shown in FIG. 6 is similar to that previously described; however, in FIG 6, separate rectifier diodes 40, 41, 42, and 43 are provided instead of the encapsulated rectifier bridge module 27 of FIGS. 2 through 5. The rectifier diodes 42 and 43 are each covered by a length of insulating tubing 45 in order to insure that the diodes are adequately insulated from other electrical components within the recesses. A capicator 46 is also provided, in the alternative embodiment of FIG. 6, between the binding posts 15c and 16c for voltage surge suppression. The use of the capacitor 46 further illustrates the manner in which other, or additional, electrical components may be contained in the terminal block assembly. The rectifier diodes 40 through 43 are electrically connected to the binding posts 11c, 12c, 15c, and 16c in the well-known full-wave bridge rectifier circuit.

It is desirable that the terminal block assembly provide some means whereby, after the assembly has been completely encapsulated, the input and output terminals may be identified. Visible indicating means is provided for this purpose by the configuration of the molded block 10, itself. Referring to FIGS. 1, 3, and 6, it will be noted that the mounting support 10a is clearly distinguishable from the mounting support 10b in that the support 10b may be likened to the tail of an arrow whereas the support 10a appears as the head of an arrow. In the preferred form of construction, the rectifier diode bridge module or individual rectifiers are so assembled into the terminal block that the terminals 11 and 12 nearest the support 10a provide the desired rectified output. The terminals 15 and 16, nearest the support 10b, are thus adapted to receive the alternating current input. Further indicia may be provided on the terminal block as desired by painting numerals or the like thereon.

Thus, the present invention provides a structure which is compact, relatively resistant to being damaged in ordinary handling, and which lends itself to convenient use in a large number of electrical devices and circuits.

While certain preferred embodiments of the invention have been specifically disclosed, it is understood that the invention is not limited thereto, as many variations will be readily apparent to those skilled in the art and the invention is to be given its broadest possible interpretation within the terms of the following claim.

I claim:

A combined terminal block and semiconductor assembly comprising an insulating terminal block of generally rectangular cross section, said terminal block having a generally rectangularly shaped relatively deep recess on the underside thereof defined by a pair of oppositely disposed side wall portions, an inner wall and a pair of oppositely disposed outwardly diverging end wall portions, a generally rectangular relatively shallow recess centrally disposed in said inner wall and adapted for receiving and positioning electrical components therein, said shallow recess being sized in relation to the area of said inner wall so as to define, on said inner wall surrounding said shallow recess, a peripheral marginal area of substantial width between said end wall and side wall portions and respective edges of said shallow recess, at least two pairs of electrically conductive terminal members carried by the block, each of said terminal members being provided, at an upper surface of the block, with fastening means and extending from the upper surface of the block through an associated aperture in the block and terminating in a binding post portion disposed in said recess at the peripheral marginal area of the inner wall, a semiconductor rectifier module having a set of input terminals adapted for connection to a source of alternating current and having a set of output terminals providing a source of direct current when said input terminals are connected to the source of alternating current, said module being positioned in said shallow recess and having its input terminals electrically connected to the binding post portions of a first pair of said terminal members and its output terminals connected to the binding post portions of a second pair of terminal members, mounting supports disposed at opposite ends of the block, one of said mounting supports being bluntly shaped, and the other being pointed, and insulative encapsulating material filling said recesses and encapsulating said binding post portions and said semiconductor module, said first pair of terminal members being disposed adjacent the bluntly-shaped mounting support, and said second pair of terminal members being disposed adjacent the pointed mounting support, whereby said first and second pairs of terminal members are positively identifiable with respect to each other by their positions relative to the differently shaped mounting supports, said second pair of terminal members being thus identified as providing a source of direct current when said first pair of terminal members is connected to the source of alternating current.

References Cited

UNITED STATES PATENTS 3,178,621    4/1965    Glickman    174—52

FOREIGN PATENTS 591,922    4/1925    France.

ROBERT K. SCHAEFER, *Primary Examiner.*

W. C. GARVERT, D. SMITH, Jr., *Assistant Examiners.*